United States Patent
Hama et al.

(10) Patent No.: US 7,482,409 B2
(45) Date of Patent: Jan. 27, 2009

(54) PROCESS FOR PRODUCING ETHYLENE-α-OLEFIN-POLYENE COPOLYMER

(75) Inventors: Hisakatsu Hama, Ichihara (JP); Hidetake Hozumi, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/021,497

(22) Filed: Jan. 29, 2008

(65) Prior Publication Data

US 2008/0182947 A1 Jul. 31, 2008

(30) Foreign Application Priority Data

Jan. 31, 2007 (JP) .............................. 2007-021182

(51) Int. Cl.
*C08F 2/00* (2006.01)
*C08F 2/38* (2006.01)
*C08F 232/06* (2006.01)

(52) U.S. Cl. ............................. 526/65; 526/73; 526/282
(58) Field of Classification Search .................. 526/65, 526/73, 282
See application file for complete search history.

(56) References Cited

U.S. PATENT DOCUMENTS 6,316,546 B1 * 11/2001 Ong et al. ..................... 525/53

FOREIGN PATENT DOCUMENTS

JP 57-131212 A 8/1982
JP 2002-505357 A 2/2002

* cited by examiner

*Primary Examiner*—Fred M Teskin
(74) *Attorney, Agent, or Firm*—Sughrue Mion, PLLC

(57) ABSTRACT

The object of the present invention is to provide a process for producing an ethylene-α-olefin-polyene copolymer by continuous multistage polymerization which can give an ethylene-α-olefin-polyene copolymer excellent in a form retention property during extrusion. The process for producing an ethylene-α-olefin-polyene copolymer comprises continuously polymerizing ethylene, α-olefin, and the following polyene (A) and polyene (B) in a solvent in the presence of an olefin polymerization catalyst using a polymerization reaction apparatus comprising two tanks of polymerization reactors connected in series, wherein the polymerization is carried out under specific conditions:
polyene (A): at least one polyene selected from norbornadienes and vinylnorbornenes,
polyene (B): polyene other than the polyene (A).

2 Claims, No Drawings

US 7,482,409 B2

PROCESS FOR PRODUCING ETHYLENE-α-OLEFIN-POLYENE COPOLYMER

FIELD OF THE INVENTION

The present invention relates to a process for producing an ethylene-α-olefin-polyene copolymer.

BACKGROUND OF THE INVENTION

Ethylene-α-olefin-polyene copolymers such as ethylene-propylene-dicyclopentadiene copolymers are widely used as materials for automobiles, industrial apparatuses, OA apparatuses, construction materials, etc. As a process for producing the ethylene-α-olefin-polyene copolymers, there is known a process which comprises preparing two kinds of ethylene-α-olefin-polyene copolymers and melt mixing them for obtaining polymers having desired physical properties depending on the use.

As other process, there is known a process for producing an ethylene-α-olefin copolymer by continuous multistage polymerization using a multistage polymerization reaction apparatus comprising two or more tanks of polymerization reactors connected in series. For example, Patent Documents 1 and 2 disclose a continuous multistage polymerization of ethylene, propylene and 5-ethylidene-2-norbornene by carrying out a first polymerization in a first polymerization reactor and then feeding the whole of the resulting reaction mixture, an additional solvent, additional monomers and the like to a second polymerization reactor of the same volume as the first polymerization reactor, and carrying out a second polymerization in the second polymerization reactor. Patent Document 2 discloses that the production process by a continuous multistage polymerization is economically advantageous.

(Patent Document 1) JP-A-57-131212
(Patent Document 2) JP-A-2002-505357

BRIEF SUMMARY OF THE INVENTION

However, the ethylene-α-olefin-polyene copolymers obtained by the conventional continuous multistage polymerization are not satisfactory in a form retention property during extrusion.

Under the circumstances, the object of the present invention is to provide a process for producing an ethylene-α-olefin-polyene copolymer by continuous multistage polymerization which can give an ethylene-α-olefin-polyene copolymer excellent in a form retention property during extrusion.

The present invention relates to a process for producing an ethylene-α-olefin-polyene copolymer which comprises continuously polymerizing ethylene, α-olefin, the following polyene (A) and the following polyene (B) in a solvent in the presence of an olefin polymerization catalyst using a polymerization reaction apparatus comprising two tanks of polymerization reactors connected in series, wherein the polymerization is carried out under the polymerization conditions which satisfy all of the following (1)-(7):

polyene (A): at least one polyene selected from norbornadienes and vinylnorbornenes,
polyene (B): polyene other than the polyene (A);
(1) polymerization temperature (T1) in the first tank: from −20° C. to 200° C.,
(2) polymerization pressure (P1) in the first tank: from 0.1 to 10 MPa,
(3) polymerization temperature (T2) in the second tank: from −20° C. to 200° C.,
(4) polymerization pressure (P2) in the second tank: from 0.1 to 10 MPa,
(5) a ratio ($\tau 1/\tau 2$) of average residence time in the first tank ($\tau 1$, unit: hr) to average residence time in the second tank ($\tau 2$, unit: hr): from 1.2 to 10,
(6) a ratio (Db1/Da1) of an amount of polyene (B) fed to the first tank (Db1: unit mol/hr) to an amount of polyene (A) fed to the first tank (Da1: unit mol/hr): from 0.5 to 20, and
(7) a value F of the following formula: from 2 to 20

$$F = (Da1/M1)/(Da2/M2)$$

Da1: an amount of polyene (A) fed to the first tank (mol/hr)
M1: an amount of total monomers fed to the first tank (mol/hr)
Da2: an amount of polyene (A) fed to the second tank (mol/hr)
M2: an amount of total monomers fed to the second tank (mol/hr)
(Da2 and M2 include the amounts of the polyene and monomers flowing into the second tank from the first tank).

ADVANTAGES OF THE INVENTION

The present invention can provide a process for producing an ethylene-α-olefin-polyene copolymer by continuous multistage polymerization according to which there is obtained an ethylene-α-olefin-polyene copolymer excellent in a form retention property during extrusion.

DETAILED DESCRIPTION OF THE INVENTION

According to the present invention, ethylene, α-olefin and polyene are continuously polymerized in a solvent in the presence of an olefin polymerization catalyst using a polymerization reaction apparatus comprising two tanks of polymerization reactors connected in series.

As the olefin polymerization catalyst, there may be used catalysts obtained by subjecting a transition metal compound and an activation co-catalyst to a contact treatment, and examples of the catalysts are those which are obtained by using a vanadium compound as the transition metal compound and an organoaluminum compound as the activation co-catalyst; and by using a transition metal compound having a ligand having a cyclopentadiene type anion skeleton as the transition metal compound and an organoaluminumoxy compound, a boron compound, an organoaluminum compound or the like as the activation co-catalyst.

As the vanadium compound, mention may be made of a compound represented by the formula $VO(OR)_n X_{3-n}$ (wherein R represents a hydrocarbon group, X represents a halogen atom, and n represents a numeral of from 0 to 3), and more specific examples are $VOCl_3$, $VO(OCH_3)Cl_2$, $VO(OCH_3)_2Cl$, $VO(OCH_3)_3$, $VO(OC_2H_5)Cl_2$, $VO(OC_2H_5)_2Cl$, $VO(OC_2H_5)_3$, $VO(OC_3H_7)Cl_2$, $VO(OC_3H_7)_2Cl$, $VO(OC_3H_7)_3$ or mixtures thereof.

As the transition metal compounds having a ligand having a cyclopentadiene type anion skeleton, mention may be made of metallocene compounds represented by the formula $R^1_k R^2_l R^3_m R^4_n M^1$ (wherein $M^1$ represents a transition metal belonging to Group 4 of the periodic table (zirconium, titanium, hafnium, etc.), $R^1$ represents a ligand having a cyclopentadiene type anion skeleton, $R^2$, $R^3$ and $R^4$ each represent a ligand having a cyclopentadiene type anion skeleton, an alkyl group, a cycloalkyl group, an aryl group, an aralkyl group, an alkoxy group, an aryloxy group, a halogen atom or a hydrogen atom, and k and l each represent an integer of 1 or more, and k+l+m+n=4).

Examples of the metallocene compounds are bis(cyclopentadienyl)diethyltitanium, bis(cyclopentadienyl)dimethyltitanium, bis(pentamethylcyclopentadienyl)dimethyltitanium, bis(cyclopentadienyl)dichlorotitanium, bis(cyclopentadienyl)titanium monochloride monohydride, bis(indenyl)titanium monochloride monohydride, bis(indenyl)titanium dichloride, ethylenebis(indenyl)dimethyltitanium, ethylenebis(indenyl)methyltitanium chloride, ethylenebis(indenyl)titanium dichloride, ethylenebis(4,5,6,7-tetrahydro-1-indenyl)titanium dichloride, ethylenebis(4,5,6,7-tetrahydro-1-indenyl)dimethyltitanium, ethylenebis(4-methyl-1-indenyl) titanium dichloride, ethylenebis(2,3-dimethyl-1-indenyl) titanium dichloride, bis(cyclopentadienyl)diethyltitanium, bis(cyclopentadienyl)dimethylzirconium, bis(pentamethylcyclopentadienyl)dimethylzirconium, bis(cyclopentadienyl) dichlorozirconium, bis(cyclopentadienyl)zirconium monochloride monohydride, bis(indenyl)zirconium monochloride monohydride, bis(indenyl)zirconium dichloride, ethylenebis(indenyl)dimethylzirconium, ethylenebis(indenyl)methylzirconium chloride, ethylenebis(indenyl)zirconium dichloride, ethylenebis(4,5,6,7-tetrahydro-1-indenyl)zirconium dichloride, ethylenebis(4,5,6,7-tetrahydro-1-indenyl)dimethylzirconium, ethylenebis(4-methyl-1-indenyl)zirconium dichloride, ethylenebis(2,3-dimethyl-1-indenyl)zirconium dichloride, etc.

Examples of the organoaluminum compounds are trimethylaluminum, triethylaluminum, tri-n-butylaluminum, triisobutylaluminum, tri-n-hexylaluminum, diisobutylhexylaluminum, diisobutyloctylaluminum, isobutyldihexylaluminum, isobutyldioctylaluminum, etc.

Examples of the organoaluminumoxy compounds are tetramethyldialuminoxane, tetraethyldialuminoxane, tetrabutyldialuminoxane, tetrahexyldialuminoxane, methylaluminoxane, ethylaluminoxane, butylaluminoxane, hexylaluminoxane, etc.

Examples of the boron compounds are tris(pentafluorophenyl)borane, triphenylcarbeniumtetrakis(pentafluorophenyl)borate, tri(n-butyl)ammoniumtetrakis(pentafluorophenyl)borate, N,N-dimethylaniliniumtetrakis(pentafluorophenyl)borate, etc.

In the contact treatment of the transition metal compound and the organoaluminum compound, the amount of the organoaluminum compound subjected to the contact treatment is usually from 2 to 2000 mols, preferably from 4 to 1500 mols, more preferably from 6 to 1000 mols in terms of aluminum atom of the organoaluminum compound per 1 mol of transition metal atom. In the contact treatment of the transition metal compound and the organoaluminumoxy compound, the amount of the organoaluminumoxy compound subjected to the contact treatment is usually from 1 to 10000 mols, preferably from 5 to 7500 mols, more preferably from 10 to 5000 mols in terms of aluminum atom of the organoaluminumoxy compound per 1 mol of transition metal atom. In the contact treatment of the transition metal compound and the boron compound, the amount of the boron compound subjected to the contact treatment is usually from 1 to 20 mols, preferably from 1.5 to 15 mols, more preferably from 2 to 10 mols in terms of boron atom of the boron compound per 1 mol of transition metal atom.

Examples of the α-olefins are straight chain (linear) olefins such as propylene, 1-butene, 1-pentene, 1-hexene, 1-heptene, 1-octene, 1-nonene and 1-decene; and branched chain olefins such as 3-methyl-1-butene, 3-methyl-1-pentene and 4-methyl-1-pentene. One or more of the α-olefins are used, and α-olefins of 3-20 carbon atoms are preferred, and propylene and 1-butene are more preferred, and propylene is particularly preferred.

In the present invention, the following polyene (A) and polyene (B) are used as the polyenes.

Polyene (A): at least one polyene selected from norbornadienes and vinylnorbornenes Polyene (B): polyene other than the polyene (A)

The norbornadienes of polyene (A) include norbornadiene and substituted norbornadienes. Examples thereof are 2,5-norbornadiene, 7-methyl-2,5-norbornadiene, 7-ethyl-2,5-norbornadiene, 7-propyl-2,5-norbornadiene, 7-butyl-2,5-norbornadiene, 7-pentyl-2,5-norbornadiene, 7-hexyl-2,5-norbornadiene, 7,7-dimethyl-2,5-norbornadiene, 7,7-methylethyl-2,5-norbornadiene, 7-chloro-2,5-norbornadiene, 7-bromo-2,5-norbornadiene, 7-fluoro-2,5-norbornadiene, 7,7-dichloro-2,5-norbornadiene, 1-methyl-2,5-norbornadiene, 1-ethyl-2,5-norbornadiene, 1-propyl-2,5-norbornadiene, 1-butyl-2,5-norbornadiene, 1-chloro-2,5-norbornadiene, 1-bromo-2,5-norbornadiene, etc.

The vinylnorbornenes of polyene (A) include polycyclic hydrocarbons having norbornene skeleton which are substituted with vinyl group, such as, for example, 5-vinyl-2-norbornene.

The polyenes (A) are preferably 2,5-norbornadiene and 5-vinyl-2-norbornene.

Examples of the polyenes (B) are 1,4-hexadiene, 1,5-hexadiene, 1,5-heptadiene, 1,6-heptadiene, 1,6-octadiene, 1,7-octadiene, 1,7-nonadiene, 1,8-nonadiene, 1,8-decadiene, 1,9-decadiene, 1,12-tetradecadiene, 1,13-tetradecadiene, 3-methyl-1,4-hexadiene, 3-methyl-1,5-hexadiene, 3-ethyl-1,4-hexadiene, 3-ethyl-1,5-hexadiene, 3,3-dimethyl-1,4-hexadiene, 3,3-dimethyl-1,5-hexadiene, dicyclopentadiene, 5-ethylidene-2-norbornene, etc. Preferred are 5-ethylidene-2-norbornene and 1,4-hexadiene.

In the present invention, in addition to ethylene and α-olefin and polyene, other copolymerizable olefinic monomers may be used for carrying out the copolymerization. The olefinic monomers include vinyl aromatic compounds, vinyl alicyclic compounds, cyclic olefins, etc.

Examples of the vinyl aromatic compounds are styrene, o-methylstyrene, m-methylstyrene, p-methylstyrene, etc. Examples of the vinyl alicyclic compounds are vinylcyclohexane, vinylcycloheptane, vinylcyclooctane, etc. Examples of the cyclic olefins are cyclohexene, 2-norbornene, etc.

As the solvents, there may be used inert solvents, for example, aliphatic hydrocarbons such as propane, butane, isobutane, pentane, hexane, heptane, octane, decane and dodecane; alicyclic hydrocarbons such as cyclopentane and cyclohexane; and the like.

As the polymerization reaction apparatus, there may be used a continuous multistage polymerization reaction apparatus comprising two tanks of polymerization reactors connected in series in which the reaction mixture obtained by polymerization in the first tank of polymerization reactor is then continuously fed to the second tank of polymerization reactor whereby polymerization of ethylene, α-olefin and polyene, and, if necessary, other copolymerizable olefinic monomers can be performed.

The polymerization reactor is provided with a rotatable agitation shaft having an agitating blade, and as the agitating blade, mention may be made of, for example, tilted paddle blade, turbine blade, anchor blade, helical ribbon blade, large plate blade, etc. The small blades such as tilted paddle blade and turbine blade may be provided in multiple stages. For removal of the heat generated in the polymerization reaction, there may be optionally employed a method of using a temperature regulation jacket fitted to the reaction apparatus or a method of cooling with utilization of evaporation latent heat of solvent and monomers.

A solvent, a polymerization catalyst and monomers (ethylene, α-olefin, polyene and, if necessary, other copolymerizable olefinic monomers), and, if necessary, a chain transfer agent are fed to the first tank of the polymerization reactor, where ethylene, α-olefin, polyene and, if necessary, other copolymerizable olefinic monomers are continuously polymerized in the solvent to produce a polymer component (X) having a monomer unit based on ethylene, a monomer unit based on α-olefin and a monomer unit based on polyene. As for the polymerization catalyst, a transition metal compound and an activation co-catalyst may be separately fed to the polymerization reactor and may be subjected to contact treatment in the polymerization reactor, and the respective monomers may be fed separately or may be previously mixed and then fed to the polymerization reactor.

Hydrogen or the like is used as the chain transfer agent, and hydrogen is preferred.

The polymerization temperature (T1) in the first tank is from −20° C. to 200° C., preferably from 0° C. to 150° C., more preferably from 20° C. to 120° C.

The polymerization pressure (P1) in the first tank is from 0.1 to 10 MPa, preferably from 0.1 to 5 MPa, more preferably from 0.1 to 3 MPa.

The ratio (D1/M1) of the total amount of polyenes fed to the first tank (D1, unit: mol/hr) to the total amount of monomers fed to the first tank (M1, unit: mol/hr) is usually from 0.00001 to 0.05, preferably from 0.0001 to 0.03.

The ratio (Db1/Da1) of the amount of polyene (B) fed to the first tank (Db1: unit mol/hr) to the amount of polyene (A) fed to the first tank (Da1: unit mol/hr) is from 0.5 to 20, preferably from 0.6 to 18, more preferably from 0.7 to 16.

The ratio (H1/M1) of the amount of chain transfer agent fed to the first tank (H1, unit: mol/hr) to the amount of monomers fed to the first tank (M1, unit: mol/hr) is usually from 0 to 0.022, preferably from 0 to 0.0044.

The concentration of the monomer in the solution in the first tank is usually from 0.05 to 30 mol/L.

The concentration of the olefin polymerization catalyst in the solution in the first tank is usually from 0.0001 to 500 µmol/g, preferably from 0.0005 to 100 µmol/g, more preferably from 0.001 to 50 µmol/g in terms of the transition metal catalyst.

The intrinsic viscosity (η1) of the polymer component (X) produced in the first tank is from 1.0 to 5.0 dl/g, preferably from 1.2 to 4.5 dl/g, more preferably from 1.5 to 4.0 dl/g.

The content (E1) of monomer unit based on ethylene in the polymer component (X) produced in the first tank is preferably from 45 to 80% by weight, more preferably from 50 to 70% by weight, further preferably from 50 to 65% by weight, with a proviso that the total content of the monomer unit based on ethylene and the monomer unit based on α-olefin in the polymer component (X) is assumed to be 100% by weight. The content can be obtained by infrared spectroscopic method.

The total content of the monomer unit based on ethylene and the monomer unit based on α-olefin in the polymer component (X) produced in the first tank is preferably not less than 85% by weight, more preferably not less than 88% by weight, further preferably not less than 90% by weight, with a proviso that the total content of the monomer units in the polymer component (X) is assumed to be 100% by weight. The content can be obtained by infrared spectroscopic method.

The content of monomer unit based on polyene in the polymer component (X) produced in the first tank is preferably from 0.3 to 20% by weight, more preferably from 0.5 to 18% by weight, further preferably from 1 to 16% by weight, with a proviso that the total content of the monomer units in the polymer component (X) is assumed to be 100% by weight. The content can be obtained by infrared spectroscopic method.

The reaction mixture sent from the first tank of polymerization reactor, monomers (ethylene, α-olefin, polyene and, if necessary, other copolymerizable olefinic monomers), if necessary, a chain transfer agent, a solvent and a polymerization catalyst are fed to the second tank of polymerization reactor, and ethylene, α-olefin, polyene and, if necessary, other copolymerizable olefinic monomers are continuously polymerized in the solvent to produce a polymer component (Y) having a monomer unit based on ethylene and a monomer unit based on α-olefin and a monomer unit based on polyene. As for the polymerization catalyst, a transition metal compound and an activation co-catalyst may be separately fed to the polymerization reactor and may be subjected to contact treatment in the polymerization reactor, and the respective monomers may be fed separately or may be previously mixed and then fed to the polymerization reactor.

The polymerization temperature (T2) in the second tank is from −20° C. to 200° C., preferably from 0° C. to 150° C., more preferably from 20° C. to 120° C.

The polymerization pressure (P2) in the second tank is from 0.1 to 10 MPa, preferably from 0.1 to 5 MPa, more preferably from 0.1 to 3 MPa.

The ratio (τ1/τ2) of average residence time in the first tank (τ1, unit: hr) to average residence time in the second tank (τ2, unit: hr) is from 1.2 to 10, preferably from 1.25 to 7.5.

The average residence time (τ1) in the first tank is a ratio (Xv/Xv1) of a volume of reaction zone in the first tank (Xv, unit: L) to an amount of solvent fed to the first tank per 1 hour (Xv1, unit: L/hr, a volume at 20° C. and normal pressure), and the average residence time (τ2) in the second tank is a ratio (Yv/Yv1) of a volume of reaction zone in the second tank (Yv, unit: L) to an amount of solvent fed to the second tank per 1 hour (Yv1, unit: L/hr, a volume at 20° C. and normal pressure).

It is preferred to adjust the volume of reaction zone in the second tank (Yv) so that the ratio (Xv/Yv) of the volume of reaction zone in the first tank (Xv) to the volume of reaction zone in the second tank (Yv) is preferably from 1/1 to 1/10, more preferably from 4/5 to 1/3.

The concentration of the monomer in the solution in the second tank is usually from 0.05 to 30 mol/L.

The concentration of the olefin polymerization catalyst in the solution in the second tank is usually from 0.0001 to 500 mol/g, preferably from 0.0005 to 100 µmol/g, more preferably from 0.001 to 50 µmol/g in terms of the transition metal catalyst.

The ratio (Da2/M2) of the amount of polyene (A) fed to the second tank (Da2: unit mol/hr) to the amount of total monomers fed to the second tank (M2: unit mol/hr) is such a value as the value F of the following formula satisfying from 2 to 20, preferably from 2.5 to 18, more preferably from 3 to 16, and Da2 and M2 include the amounts of the polyene and monomers flowing into the second tank from the first tank.

$$F=(Da1/M1)/(Da2/M2)$$

Da1: an amount of polyene (A) fed to the first tank (mol/h r)

M1: an amount of total monomers fed to the first tank (mol/hr)

Da2: an amount of polyene (A) fed to the second tank (mol/hr)

M2: an amount of total monomers fed to the second tank (mol/hr)

(Da2 and M2 include the amounts of the polyene and monomers flowing into the second tank from the first tank).

The ratio (H2/M2) of the amount of chain transfer agent fed to the second tank (H2, unit: mol/hr) to the amount of monomers fed to the second tank (M2, unit: mol/hr) is usually from 0 to 0.044, preferably from 0 to 0.0089. Here, H2 and M2 include the amounts of chain transfer agent and monomers flowing into the second tank from the first tank, respectively.

Furthermore, the ratio (H2/M2) of the amount of chain transfer agent fed to the second tank (H2) to the amount of monomers fed to the second tank (M2) is such a value that the value G of the following formula satisfies from 0 to 0.5, preferably from 0 to 0.3:

$$G=(H1/M1)/(H2/M2)$$

H1: an amount of a chain transfer agent fed to the first tank (mol/hr)

M1: an amount of total monomers fed to the first tank (mol/hr)

H2: an amount of a chain transfer agent fed to the second tank (mol/hr)

M2: an amount of total monomers fed to the second tank (mol/hr).

The intrinsic viscosity ($\eta 2$) of the polymer component (Y) produced in the second tank is from 1.0 to 5.0 dl/g, preferably from 1.2 to 4.5 dl/g, more preferably from 1.5 to 4.0 dl/g.

The content (E2) of monomer unit based on ethylene in the polymer component (Y) produced in the second tank is preferably from 45 to 80% by weight, more preferably from 50 to 70% by weight, further preferably from 50 to 65% by weight, with a proviso that the total content of the monomer unit based on ethylene and the monomer unit based on $\alpha$-olefin in the polymer component (Y) is assumed to be 100% by weight. The content can be obtained by infrared spectroscopic method.

The total content of the monomer unit based on ethylene and the monomer unit based on $\alpha$-olefin in the polymer component (Y) produced in the second tank is preferably not less than 85% by weight, more preferably not less than 88% by weight, further preferably not less than 90% by weight, with a proviso that the total content of the monomer units in the polymer component (Y) is assumed to be 100% by weight. The content can be obtained by infrared spectroscopic method.

The content of monomer unit based on polyene in the polymer component (Y) produced in the second tank is preferably from 0.3 to 20% by weight, more preferably from 0.5 to 18% by weight, further preferably from 1 to 16% by weight, with a proviso that the total content of the monomer units in the polymer component (Y) is assumed to be 100% by weight. The content can be obtained by infrared spectroscopic method.

The weight ratio of the polymer component (X) produced in the first tank to the polymer component (Y) produced in the second tank is preferably from 1/4 to 4/1, more preferably from 1/3 to 3/1.

An ethylene-$\alpha$-olefin-polyene copolymer can be taken out from the reaction mixture drawn from the second tank of polymerization reactor by known desolvating treatment, drying treatment, etc.

The intrinsic viscosity of the ethylene-$\alpha$-olefin-polyene copolymer is preferably from 1 to 3.5 dl/g, more preferably from 1.2 to 3 dl/g. The molecular weight distribution (Mw/Mn) of the olefin copolymer is preferably from 3 to 7. The intrinsic viscosity is measured in a xylene solution at 70° C. The molecular weight distribution (Mw/Mn) is measured by gel permeation chromatography (GPC).

The content of the monomer unit based on ethylene in the ethylene-$\alpha$-olefin-polyene copolymer is preferably from 45 to 80% by weight, more preferably from 50 to 65% by weight, with a proviso that the total content of the monomer unit based on ethylene and the monomer unit based on $\alpha$-olefin in the ethylene-1-olefin-polyene copolymer is assumed to be 100% by weight. The content can be obtained by infrared spectroscopic method.

The total content of the monomer unit based on ethylene and the monomer unit based on $\alpha$-olefin in the ethylene-$\alpha$-olefin-polyene copolymer is preferably not less than 85% by weight, more preferably not less than 88% by weight, further preferably not less than 90% by weight, with a proviso that the total content of the monomer units in the ethylene-$\alpha$-olefin-polyene copolymer is assumed to be 100% by weight. The content can be obtained by infrared spectroscopic method.

The content of monomer unit based on polyene in the ethylene-$\alpha$-olefin-polyene copolymer is preferably from 0.3 to 20% by weight, more preferably from 0.5 to 18% by weight, further preferably from 1 to 16% by weight, with a proviso that the total content of the monomer units in the polymer component (X) is assumed to be 100% by weight. The content can be obtained by infrared spectroscopic method.

It is expected that the ethylene-$\alpha$-olefin-polyene copolymers obtained by the present invention are excellent in a form retention property of an extrusion molded rubber thereof. Utilizing these excellent characteristics, they can be suitably used for uses such as extrusion worked materials, for example, automobile materials, construction materials, industrial materials and electric wire materials.

EXAMPLES

The present invention will be explained below using examples and comparative examples. The evaluation of physical properties of the polymer was conducted by the following methods.

(1) Mooney Viscosity ($ML_{1+4}$)

The Mooney viscosity was measured at 100° C. in accordance with JIS K6395 (1997).

(2) Amount of Ethylene Unit and Amount of Propylene Unit:

Content of monomer unit based on ethylene (amount of ethylene unit) and content of monomer unit based on propylene (amount of propylene unit) were measured by infrared spectroscopic method. The amount of ethylene unit and the amount of propylene unit were obtained assuming that the total amount of the amount of ethylene unit and the amount of propylene unit was 100% by weight. A film of about 0.1 mm in thickness was used as a sample, and absorption peak at 1155 $cm^{-1}$ originating from the methyl branch and absorption peak at 721 $cm^{-1}$ originating from the methylene group were measured in accordance with literature value ("Characterization of Polyethylene by Infrared Absorption Spectrum" by Takayama, Usami and others, or "Die Makromolekulare Chemie", 177, 461 (1976) by Mc Rae, M. A., MadamS, W. F. and others) by an infrared spectrophotometer (IR-810 manufactured by Nihon Bunko Kogyo Co, Ltd.). Ethylene homopolymer, propylene homopolymer and ethylene-propylene copolymer (amount of ethylene unit: 50 wt %, amount of propylene unit: 50 wt %) were used as standard samples.

(3) Iodine Value:

A polymer was molded into a film of about 0.5 mm in thickness by a pressing machine, and a peak of the film originating from 5-ethylidene-2-norbornene (absorption peak of 1688 cm$^{-1}$) was measured by the infrared spectrophotometer, and molar content of double bond in the polymer was obtained. The iodine value was calculated from the molar content.

(4) Form Retention Property:

(Preparation of Composition for Evaluation)

100 parts by weight of ethylene-α-olefin-non-conjugated diene copolymer was mixed with 100 parts by weight of SRF-HS carbon (trademark: ASAHI 50HG manufactured by Asahi Carbon Co., Ltd.), 80 parts by weight of paraffin oil (trademark: DIANA PS430 manufactured by Idemitsu Kosan Co., Ltd.), 5 parts by weight of zinc oxide and 1 part by weight of stearic acid by BB-2 mixer (1.7 L) manufactured by Kobe Steel, Ltd. to prepare a rubber composition. Then, the resulting rubber composition was mixed with 1.0 part by weight of sulfur, 1.6 part by weight of 2-mercaptobenzothiazole as a vulcanization accelerator, 0.56 part by weight of tetramethylthiuram disulfide as a vulcanization accelerator, 1.6 part by weight of zinc dibutyldithiocarbamate, and 0.49 part by weight of dipentamethylenethiuram tetrasulfide by a 10 inch roll adjusted to 40° C. to obtain a composition for evaluation.

(Evaluation of Form Retention Property)

A rubber tube of 1 mm in wall thickness was molded using a 45 mm extruder (L/D=16) manufactured by Nakata Zoki Co., Ltd. provided with a tube die having an inner diameter of 9 mm and an outer diameter of 11 mm. The rubber tube was vulcanized at 230° C. for 5 minutes by a hot-air vulcanization apparatus to obtain a vulcanized rubber tube. The lengths of height and width of the resulting vulcanized rubber tube were measured, and a ratio of lengths of height and width was obtained. The closer to 1 the ratio is, the better the form retention property is.

Examples 1 and 2, and Comparative Examples 1-3

Copolymerization of ethylene, propylene and 5-ethylidene-2-norbornene was continuously carried out using a polymerization reaction apparatus comprising two 100 L polymerization reactors made of SUS which were connected in series. Hexane as a polymerization solvent, ethylene, propylene, 5-ethylidene-2-norbornene and 5-vinyl-2-norbornene as monomers, and vanadium oxytrichloride, ethylaluminum sesquichloride and ethanol as catalysts were continuously fed into the first polymerization reactor from the bottom thereof. 5-ethylidene-2-norbornene and 5-vinyl-2-norbornene were continuously fed as an identical hexane solution. Vanadium oxytrichloride, ethylaluminum sesquichloride and ethanol were continuously fed as hexane solutions, respectively. From the top of the first polymerization reactor was continuously drawn the reaction mixture so that the amount of the reaction mixture in the first polymerization reactor reached 100 L.

Then, while the reaction mixture drawn from the first polymerization reactor was fed into the second polymerization reactor from the bottom thereof, hexane as a polymerization solvent, ethylene, 5-ethylidene-2-norbornene and 5-vinyl-2-norbornene as monomers, and vanadium oxytrichloride, ethylaluminum sesquichloride and ethanol as catalysts and hydrogen as chain transfer agent were continuously fed into the second polymerization reactor from the bottom thereof. 5-ethylidene-2-norbornene and 5-vinyl-2-norbornene were continuously fed as an identical hexane solution. Vanadium oxytrichloride, ethylaluminum sesquichloride and ethanol were continuously fed as hexane solutions, respectively. The reaction mixture was continuously drawn from the top of the second polymerization reactor so that the amount of the reaction mixture in the second polymerization reactor reached 100 L.

Polymerization conditions are shown in Table 1.

When the whole amount of the hexane fed into the first polymerization reactor is fed into the second polymerization reactor and specific gravity of hexane is 0.66 Kg/L, the τ1/τ2 was calculated. The amount of the monomer fed from the first polymerization reactor into the second polymerization reactor was calculated by subtracting the amount of the monomer consumed in the first polymerization reactor (i.e., the amount corresponding to the copolymer produced in the first polymerization reactor, on the assumption that the ratio of the amount of the 5-ethylidene-2-norbornene monomer unit to the amount of the 5-vinyl-2-norbornene monomer unit in the copolymer produced in the first polymerization reactor is same as the ratio of the amount of the 5-ethylidene-2-norbornene monomer unit to the amount of the 5-vinyl-2-norbornene monomer unit fed into the first polymerization reactor) from the amount of the monomer fed into the first polymerization reactor. Thus, Db1/Da1 value, F value and G value were calculated.

The calculated results and the results of evaluation of the resulting ethylene-propylene-5-ethylidene-2-norbornene-5-vinyl-2-norbornene copolymer are shown in Table 1.

TABLE 1

|  |  | Example 1 | Example 2 | Comparative Example 1 | Comparative Example 2 | Comparative Example 3 |
| --- | --- | --- | --- | --- | --- | --- |
| Polymerization conditions First tank |  |  |  |  |  |  |
| Hexane | Kg/hr | 125.6 | 125.6 | 123.5 | 123.5 | 123.5 |
| Ethylene | Kg/hr | 1.63 | 1.63 | 2.10 | 2.50 | 2.10 |
| Propylene | Kg/hr | 5.16 | 5.16 | 13.0 | 13.0 | 13.0 |
| ENB | Kg/hr | 0.367 | 0.367 | 0.46 | 0.46 | 0.60 |
| VNB | Kg/hr | 0.067 | 0.067 | 0.019 | 0.019 | 0.025 |
| Hydrogen | NL/hr | 0 | 0 | 0 | 0 | 0 |
| VOCl$_3$ | Kg/hr | 0.0023 | 0.0032 | 0.0028 | 0.0101 | 0.0059 |
| EASC | Kg/hr | 0.0189 | 0.0264 | 0.0168 | 0.0606 | 0.0354 |
| Ethyl alcohol | Kg/hr | 0.0011 | 0.0016 | 0 | 0 | 0 |
| Concentration of polyene solution | wt % | 0.996 | 0.996 | 0.995 | 0.995 | 0.995 |

TABLE 1-continued

|  |  | Example 1 | Example 2 | Comparative Example 1 | Comparative Example 2 | Comparative Example 3 |
|---|---|---|---|---|---|---|
| (ENB) |  | (0.843) | (0.843) | (0.956) | (0.956) | (0.956) |
| (VNB) |  | (0.153) | (0.153) | (0.039) | (0.039) | (0.039) |
| Concentration of $VOCl_3$ solution | wt % | 0.621 | 0.621 | 0.621 | 0.621 | 0.621 |
| Concentration of EASC solution | wt % | 4.369 | 4.388 | 4.291 | 4.266 | 4.266 |
| Concentration of ethyl alcohol solution | wt % | 0.596 | 0.594 | — | — | — |
| Polymerization temperature | °C. | 39 | 39 | 47 | 39 | 47 |
| Polymerization pressure | MPa | 0.68 | 0.68 | 0.60 | 0.60 | 0.60 |
| Polymerization amount | Kg/hr | 2.3 | 2.6 | 2.1 | 4.1 | 2.5 |
| Proportion of amount of propylene unit in polymer | wt % | 32.4 | 36.4 | 36.4 | 45.2 | 34.7 |
| Iodine value of polymer | g/100 g | 20.3 | 20.1 | 18 | 14.5 | 21.3 |
| Second tank |  |  |  |  |  |  |
| Hexane | Kg/hr | 92.7 | 92.7 | 94.7 | 94.7 | 94.7 |
| Ethylene | Kg/hr | 1.08 | 1.08 | 0.54 | 1.00 | 0.54 |
| Propylene | Kg/hr | 0 | 0 | 0 | 0 | 0 |
| ENB | Kg/hr | 0.24 | 0.24 | 0.14 | 0.32 | 0.14 |
| VNB | Kg/hr | 0 | 0 | 0.013 | 0 | 0 |
| Hydrogen | NL/hr | 6.5 | 4.5 | 1.0 | 0.2 | 0.2 |
| $VOCl_3$ | Kg/hr | 0.0054 | 0.0054 | 0.0091 | 0.0091 | 0.0091 |
| EASC | Kg/hr | 0.0446 | 0.0446 | 0.0363 | 0.0363 | 0.0363 |
| Ethyl alcohol | Kg/hr | 0.0026 | 0.0026 | 0 | 0 | 0 |
| Concentration of polyene solution | wt % | 1 | 1 | 0.995 | 1 | 1 |
| (ENB) |  | (1) | (1) | (0.914) | (1) | (1) |
| (VNB) |  | (0) | (0) | (0.081) | (0) | (0) |
| Concentration of $VOCl_3$ solution | wt % | 1.926 | 1.950 | 1.984 | 1.984 | 1.984 |
| Concentration of EASC solution | wt % | 14 | 14 | 14 | 14 | 14 |
| Concentration of ethyl alcohol solution | wt % | 0.596 | 0.594 | 0.594 | 0.594 | 0.594 |
| Polymerization temperature | °C. | 45 | 45 | 55 | 55 | 55 |
| Polymerization pressure | MPa | 0.68 | 0.68 | 0.60 | 0.60 | 0.60 |
| Polymerization amount | Kg/hr | 1.9 | 2.1 | 1.9 | 1.9 | 1.7 |
| Proportion of amount of propylene unit in polymer | wt % | 34.2 | 36.0 | 44.4 | 45.2 | 48.3 |
| Calculated results |  |  |  |  |  |  |
| $\tau 1/\tau 2$ | — | 1.74 | 1.74 | 1.77 | 1.75 | 1.76 |
| Db1/Da1 | — | 5.50 | 5.50 | 24.4 | 24.4 | 24.4 |
| F | — | 2.13 | 2.44 | 0.70 | 2.03 | 1.48 |
| G | — | 0 | 0 | 0 | 0 | 0 |
| Properties of polymer |  |  |  |  |  |  |
| Mooney viscosity | — | 46 | 44 | 45 | 52 | 43 |
| Form retention property | — | 0.77 | 75 | 57 | 67 | 56 |

ENB: 5-ethylidene-2-norbornene
VNB: 5-vinyl-2-norbornene
$VOCl_3$: Vanadium oxytrichloride
EASC: Ethylaluminumsesquichloride
Proportion of amount of propylene unit: 100 × amount of propylene unit/(amount of ethylene unit + amount of propylene unit)
Specific gravity of solution: 0.67 kg/L

The invention claimed is:

1. A process for producing an ethylene-α-olefin-polyene copolymer which comprises continuously polymerizing ethylene, α-olefin, the following polyene (A) and the following polyene (B) in a solvent in the presence of an olefin polymerization catalyst using a polymerization reaction apparatus comprising two tanks of polymerization reactors connected in series, wherein the polymerization is carried out under the polymerization conditions which satisfy all of the following (1)-(7):

polyene (A): at least one polyene selected from norbornadienes and vinylnorbornenes, polyene (B): polyene other than the polyene (A);

(1) polymerization temperature (T1) in the first tank: from −20° C. to 200° C.,
(2) polymerization pressure (P1) in the first tank: from 0.1 to 10 MPa,
(3) polymerization temperature (T2) in the second tank: from −20° C. to 200° C.,
(4) polymerization pressure (P2) in the second tank: from 0.1 to 10 MPa,
(5) a ratio ($\tau 1/\tau 2$) of average residence time in the first tank ($\tau 1$, unit: hr) to average residence time in the second tank ($\tau 2$, unit: hr): from 1.2 to 10,
(6) a ratio (Db1/Da1) of an amount of polyene (B) fed to the first tank (Db1: unit mol/hr) to an amount of polyene (A) fed to the first tank (Da1: unit mol/hr): from 0.5 to 20, and
(7) a value F of the following formula: from 2 to 20

$$F=(Da1/M1)/(Da2/M2)$$

Da1: an amount of polyene (A) fed to the first tank (mol/hr)
M1: an amount of total monomers fed to the first tank (mol/hr)
Da2: an amount of polyene (A) fed to the second tank (mol/hr)
M2: an amount of total monomers fed to the second tank (mol/hr),
(Da2 and M2 include the amounts of the polyene and monomers flowing into the second tank from the first tank).

2. The process for producing an ethylene-α-olefin-polyene copolymer according to claim 1, wherein the polymerization is carried out further under polymerization conditions satisfying the following (8):
(8) a value G of the following formula: from 0 to 0.5

$$G=(H1/M1)/(H2/M2)$$

H1: an amount of a chain transfer agent fed to the first tank (mol/hr)
M1: an amount of total monomers fed to the first tank (mol/hr)
H2: an amount of a chain transfer agent fed to the second tank (mol/hr)
M2: an amount of total monomers fed to the second tank (mol/hr),
(H2 and M2 include the amounts of the chain transfer agent and monomers flowing into the second tank from the first tank).

* * * * *